United States Patent
Ventola et al.

(10) Patent No.: US 9,030,742 B2
(45) Date of Patent: May 12, 2015

(54) COMBINATION OPTICAL FILTER AND DIFFRACTION GRATING AND ASSOCIATED SYSTEMS AND METHODS

(71) Applicant: Optometrics Corporation, Littleton, MA (US)

(72) Inventors: David E. Ventola, Avon, MA (US); Zbynek Ryzi, Littleton, MA (US)

(73) Assignee: Optometrics Corporation, Littleton, MA (US)

( * ) Notice: Subject to any disclaimer, the term of this patent is extended or adjusted under 35 U.S.C. 154(b) by 0 days.

(21) Appl. No.: 14/274,415

(22) Filed: May 9, 2014

(65) Prior Publication Data

US 2014/0334003 A1    Nov. 13, 2014

Related U.S. Application Data

(60) Provisional application No. 61/822,264, filed on May 10, 2013.

(51) Int. Cl.
*G02B 5/18* (2006.01)
*G02B 5/20* (2006.01)

(52) U.S. Cl.
CPC .............. *G02B 5/1814* (2013.01); *G02B 5/203* (2013.01); *Y10T 29/49826* (2015.01)

(58) Field of Classification Search
CPC ...... G02B 5/18; G02B 5/1804; G02B 5/1814; G02B 5/1861; G02B 5/1866; G02B 5/20; G02B 5/203; G02B 5/204; G02B 5/205; G02B 5/206; G02B 5/208; G02B 5/225
USPC .................. 359/350–361, 558–576, 885–892
See application file for complete search history.

(56) References Cited

U.S. PATENT DOCUMENTS

| | | | |
|---|---|---|---|
| 5,139,335 A | | 8/1992 | Lundeen et al. |
| 5,363,238 A | * | 11/1994 | Akune et al. ................. 359/566 |
| 5,420,681 A | | 5/1995 | Woodruff |
| 5,448,398 A | | 9/1995 | Asakura et al. |
| 6,122,052 A | | 9/2000 | Barnes et al. |
| 6,185,043 B1 | * | 2/2001 | Imamura ....................... 359/619 |
| 6,490,060 B1 | | 12/2002 | Tai et al. |
| 6,560,049 B2 | | 5/2003 | Goto et al. |
| 6,761,959 B1 | * | 7/2004 | Bonkowski et al. .......... 428/156 |
| 2003/0190473 A1 | * | 10/2003 | Argoitia et al. ............... 428/403 |
| 2004/0212890 A1 | * | 10/2004 | Shiozaki et al. .............. 359/563 |
| 2004/0257563 A1 | | 12/2004 | Miller et al. |
| 2007/0238802 A1 | | 10/2007 | Harada et al. |
| 2010/0277937 A1 | * | 11/2010 | Ilzuka et al. .................. 362/509 |

OTHER PUBLICATIONS

Invitation to Pay Additional Fees mailed Aug. 25, 2014 for Application No. PCT/US2014/037505.

(Continued)

*Primary Examiner* — Stephone B Allen
*Assistant Examiner* — Kimberly N Kakalec
(74) *Attorney, Agent, or Firm* — Wolf, Greenfield & Sacks, P.C.

(57) ABSTRACT

Optical components and systems comprising combined optical filters and diffraction gratings are generally described. In certain embodiments, an optical filter is in contact with a diffraction grating. In certain embodiments, the optical filter and the diffraction grating can be used to diffract and direct a first portion of electromagnetic radiation incident upon the grating and filter toward a receiver while filtering a second portion of the electromagnetic radiation incident upon the grating and filter.

30 Claims, 9 Drawing Sheets

(56) References Cited

OTHER PUBLICATIONS

International Search Report and Written Opinion dated Jan. 21, 2015 for Application No. PCT/US2014/037505.

No Author Listed, 1/4m Monochromator and Imaging Spectrograph Product Description. Newport Corporation. Accessed online Feb. 22, 2015 at http://www.newport.com/MS257153-1-4-m-Monochromator-and-Imaging-Spectrog/378367/1033/info.aspx. 10 pages.

* cited by examiner

COMBINATION OPTICAL FILTER AND DIFFRACTION GRATING AND ASSOCIATED SYSTEMS AND METHODS

RELATED APPLICATIONS

This application claims priority under 35 U.S.C. §119(e) to U.S. Provisional Patent Application Ser. No. 61/822,264, filed May 10, 2013, and entitled "Combination Optical Filter and Diffraction Grating and Associated Systems and Methods," which is incorporated herein by reference in its entirety for all purposes.

TECHNICAL FIELD

Optical components and systems comprising combined optical filters and diffraction gratings are generally described.

BACKGROUND

Diffraction gratings are generally used to spatially separate a spectrum of incident radiation. In some applications it is desirable to limit the effective range of the grating so that unwanted wavelengths of incident light do not interfere with or degrade the performance of the optical system. Traditionally, this spectrum trimming is done with one or more external filtering components. Generally, in prior art systems in which diffraction gratings and filtering components are employed, the diffraction grating and the filter are separate components. This can result in an optical system that is unnecessarily large and/or complex.

Improved components, systems, and methods making use of optical filters and diffraction gratings would be desirable.

SUMMARY

Combined optical filters and diffraction gratings, and their use in various optical systems and methods, are generally described. The subject matter of the present invention involves, in some cases, interrelated products, alternative solutions to a particular problem, and/or a plurality of different uses of one or more systems and/or articles.

In some embodiments, an article is provided. The article comprises, in certain embodiments, a diffraction grating; and an optical filter in contact with the diffraction grating. In some such embodiments, the optical filter is configured to absorb at least one wavelength of incident electromagnetic radiation.

In certain embodiments, the article comprises a diffraction grating; and an optical filter in contact with the diffraction grating, wherein the article has a modulus of rigidity of at least about 10 GPa.

In some embodiments, the article comprises a diffraction grating comprising a grating surface; and an optical filter comprising an absorptive medium, the absorptive medium having a first outer surface facing the diffraction grating and a second outer surface opposite the first outer surface. In some embodiments, the optical filter is in contact with the diffraction grating. In certain embodiments, the first and second outer surfaces of the absorptive medium of the optical filter are parallel, within 2 degrees, to the grating surface of the diffraction grating. In some embodiments, the article has a modulus of rigidity of at least about 10 GPa.

In certain embodiments, the article comprises a diffraction grating and an optical filter in contact with the diffraction grating. In some such embodiments, the diffraction grating comprises a glass. In some embodiments, the diffraction grating comprises a ceramic. In certain embodiments, the diffraction grating comprises a metal. The diffraction grating comprises, in some embodiments, a polymer.

In some embodiments, the article comprises a diffraction grating and an optical filter in contact with the diffraction grating, wherein the optical filter is configured to filter at least one wavelength of ultraviolet, visible and/or infrared electromagnetic radiation. In some such embodiments, the optical filter is configured to filter at least one wavelength of visible electromagnetic radiation.

In one aspect, a method is described. The method comprises, in some embodiments, directing a first portion of incident electromagnetic radiation along a predetermined and/or adjusted direction such that an article comprising an optical filter and a diffraction grating in contact with the optical filter is exposed to the first portion; exposing the article to a second portion of incident electromagnetic radiation; and arranging a receiver and the predetermined direction relative to each other such that non-zero-order diffracted electromagnetic radiation produced by the diffraction grating from the first portion of electromagnetic radiation is incident upon the receiver. In some embodiments, the optical filter absorbs and/or reflects at least some of the second portion of the incident electromagnetic radiation and transmits at least some of the first portion of the incident electromagnetic radiation.

In one aspect, a method of making a combination filter grating is provided. The method comprises, in some embodiments, arranging an optical filter such that it is in contact with a diffraction grating. In some such embodiments, the optical filter is configured to absorb at least one wavelength of electromagnetic radiation.

In some embodiments, the method comprises arranging an optical filter such that it is in contact with a diffraction grating, wherein the combination filter grating has a modulus of rigidity of at least about 10 GPa.

In some embodiments, the method comprises arranging an optical filter such that it is in contact with a diffraction grating, wherein the optical filter is configured to filter at least one wavelength of ultraviolet, visible and/or infrared electromagnetic radiation.

In some such embodiments, the optical filter is configured to filter at least one wavelength of visible electromagnetic radiation.

In one aspect, a system is provided. The system comprises, in certain embodiments, an optical filter configured to transmit a first portion of electromagnetic radiation incident upon the optical filter and to absorb and/or reflect a second portion of the electromagnetic radiation incident upon the optical filter; a diffraction grating in contact with the optical filter and configured to receive electromagnetic radiation from and/or transmit electromagnetic radiation to the optical filter, and configured to diffract at least part of electromagnetic radiation incident upon the diffraction grating to produce zero-order diffracted electromagnetic radiation and non-zero-order diffracted electromagnetic radiation; and a receiver configured to receive at least part of the non-zero-order diffracted electromagnetic radiation from the diffraction grating.

In one aspect, a method of assembling a combination filter grating into an optical system is provided. The method comprises, in some embodiments, arranging the combination filter grating within the optical system such that an optical filter of the combination filter grating is configured to transmit a first portion of electromagnetic radiation incident on the optical filter and to absorb and/or reflect a second portion of the electromagnetic radiation incident on the optical filter; a diffraction grating of the combination filter grating is in contact with the optical filter and configured to receive electromagnetic radiation from and/or transmit electromagnetic radiation to the optical filter, and is configured to diffract at least part of electromagnetic radiation incident upon the diffraction grating to produce zero-order diffracted electromagnetic radiation and non-zero-order diffracted electromagnetic radiation; and the receiver is configured to receive at least part of the non-zero-order diffracted electromagnetic radiation from the diffraction grating.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
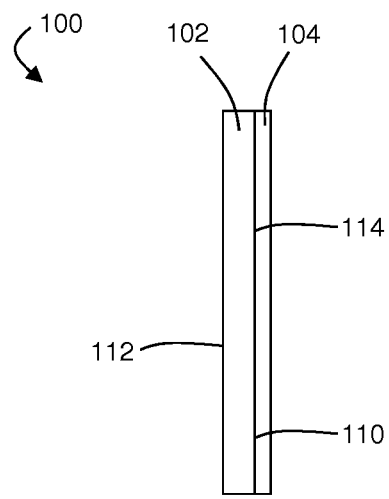
FIGS. 1A-1C are exemplary cross-sectional schematic illustrations of articles comprising optical filters and diffraction gratings, according to some embodiments.

Combinations of optical filters and diffraction gratings and their use in various optical systems and methods are generally described. In certain embodiments, an optical filter is in contact with a diffraction grating. In certain embodiments, the optical filter and the diffraction grating can be used to diffract and direct a first portion of electromagnetic radiation incident upon the grating and filter toward a receiver while filtering a second portion of the electromagnetic radiation incident upon the grating and filter.

In some such embodiments, the combination of the diffraction grating and the optical filter directs one or more wavelengths (e.g., one or more wavelengths of interest selected by a designer or user of a system) toward a receiver while inhibiting or preventing one or more other wavelengths (which may inhibit detection of the wavelengths of interest by the receiver) from reaching the receiver. As one particular example, the combined filter and diffraction grating can be configured to avoid overlap of first-order diffracted electromagnetic radiation of a first wavelength with second order, third order, or higher order diffracted electromagnetic radiation of a second wavelength. As another example, the combined optical filter and diffraction grating can be used to prevent stray light from arbitrary sources from interfering with the reception of a wavelength of interest from a known source. In some embodiments, the combined optical filter and diffraction grating can be configured to direct at least one diffracted wavelength of interest to a predetermined location, at which a receiver (e.g., a sensor, an optical element, etc.) may be positioned.

Certain prior art systems have employed diffraction gratings and optical filters as spatially separate components, for example, to preserve the ability to independently exchange one of these components for another component of the same type. Certain inventive aspects are related to the unexpected discovery that the need to independently exchange or otherwise replace filters and diffraction gratings is unnecessary for many applications. In addition, certain inventive aspects relate to the unexpected discovery that articles including optical filters and diffraction gratings in contact with each other can provide adequate performance in a wide variety of applications.

The use of articles comprising an optical filter and a diffraction grating in contact with each other can provide a variety of advantages. For example, the use of certain of the combined optical filters and diffraction gratings described herein may, in certain cases, reduce the space occupied by the optical system in which the filter(s) and grating(s) are used, reduce the number of optical elements required in the optical system, reduce the weight of the optical system, and/or reduce the cost of the optical system. The use of certain combined optical filters and diffraction gratings described herein may also reduce the time required to design and/or assemble the system. The use of combination optical filters and diffraction gratings can also simplify the alignment of optical components and/or reduce reflective losses within the optical system. In addition, according to certain embodiments, when an optical filter is in contact with the diffraction grating, the optical filter can serve as a protective layer, which can inhibit or prevent damage of the diffraction grating (e.g., when handling or otherwise using the diffraction grating).

FIG. 1A is an exemplary cross-sectional schematic illustration of an article 100 comprising optical filter 102 and diffraction grating 104 in contact with optical filter 102. In FIG. 1A, optical filter 102 and diffraction grating 104 are in direct contact. In some such embodiments, the optical filter is in direct contact with a grating surface and/or a grating feature(s) of the diffraction grating. Direct contact is generally understood to mean that at least a portion of the optical filter directly touches at least a portion of the diffraction grating. As one example, a filter/grating combination in which the optical filter and diffraction grating are in direct contact may be made by applying a dye-containing material (e.g., a polymer) directly to an external surface of a diffraction grating (e.g., a grating surface and/or a grating feature(s) of the diffraction grating), after which, the applied material may be hardened (e.g., via cross-linking, thermosetting, or any other method).

In other embodiments, optical filter 102 and diffraction grating 104 can be in indirect contact. Two articles are generally understood to be in indirect contact when at least one intermediate non-gaseous material (e.g., at least one solid or liquid material) is located between the two articles. For example, in FIG. 1B, intermediate material 106 is positioned between optical filter 102 and diffraction grating 104 such that optical filter 102 and diffraction grating 104 are in indirect contact through intermediate material 106. As one example, a filter/grating combination in which the optical filter is in indirect contact with the diffraction grating may be made by adhering the optical filter and the diffraction grating to each other with an adhesive. Examples of intermediate materials that may be positioned between optical filter 102 and diffraction grating 104 include, but are not limited to, immersion oils, water, glycerol, adhesives (e.g., curable adhesives such as epoxy adhesives, including a variety of UV curable epoxy adhesives), xylene, glass, ceramics, and the like.

In certain embodiments in which the optical filter and the diffraction grating are in indirect contact, the optical filter and the diffraction grating can be positioned such that they are relatively close to each other. For example, in some embodiments in which the optical filter and the diffraction grating are in indirect contact, the shortest distance between the optical filter and the diffraction grating is less than about 10 centimeters, less than about 1 centimeter, less than about 100 micrometers, or less than about 10 micrometers. In certain embodiments in which the optical filter and the diffraction grating are in indirect contact, the shortest distance between the optical filter and the diffraction grating is less than about 10 times, less than about 5 times, less than about 1 time, or less than about 0.5 times the thickness of the optical filter.

Figure 1B:
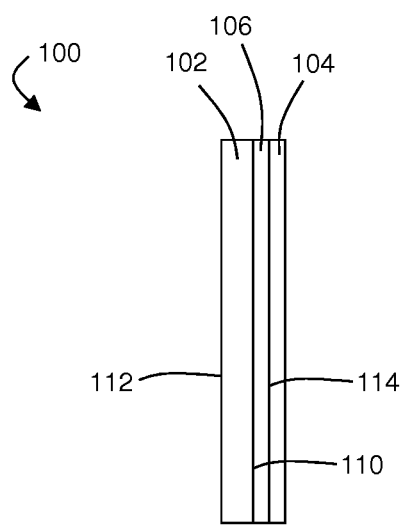

While FIGS. 1A-1B and other figures described herein illustrate optical filter 102 and diffraction grating 104 as discrete elements, optical filter 102 and diffraction grating 104 can also be formed of a unitary material, in certain embodiments. As one particular example, optical filter 102 may be formed of a glass, polymer, ceramic, or other material (optionally comprising an absorptive additive such as a dye). In some embodiments, diffraction grating 104 is made by forming grating features of a grating surface on or into one side of the filter. For example, grating features may be embossed into a surface of the optical filter. As another example, grating features may be deposited onto a surface of the optical filter. In such instances in which the diffraction grating and the optical filter are both formed into a unitary material, the diffraction grating and the optical filter are considered to be in direct contact. Of course, in other embodiments, the diffraction grating and the optical filter are not formed from a unitary material, but rather, are formed from discrete materials. The discrete optical filter and diffraction grating may be arranged such that they are in direct contact with each other, in indirect contact with each other, or otherwise arranged.

Optical filter 102 can be of any suitable type. In some embodiments, optical filter 102 may be configured to transmit at least a portion of electromagnetic radiation incident upon the optical filter and to absorb and/or reflect at least another portion of the electromagnetic radiation incident upon the filter. In this way, the optical filter can be used, in certain embodiments, to transmit a band of wavelengths of electromagnetic radiation that is narrower than the band of wavelengths incident upon the optical filter. Transmission of electromagnetic radiation through an optical component is generally understood by those of ordinary skill in the art to refer to the radiation passing from one side of the optical component to the other side. Absorption of electromagnetic radiation by an optical component is generally understood by those of ordinary skill in the art to a process by which the electromagnetic radiation is taken up by the filter, for example, through the filter absorbing the electromagnetic energy of the electromagnetic radiation and converting it to a form of energy that may be stored within the filter. Reflection of electromagnetic radiation from an optical component is generally understood by those of ordinary skill in the art to refer to the radiation arriving at an incident surface of the optical component and changing directions such that the electromagnetic radiation travels away from, but not through, the optical component.

In some embodiments, optical filter 102 may be an absorption filter. In certain embodiments, the absorption optical filter comprises an absorptive medium. The absorptive medium generally refers to the spatial portion within which absorption is achieved by the absorption optical filter. For example, referring to FIG. 1C, in certain embodiments, the absorptive medium of an absorption optical filter comprises a layer 120 (e.g., a liquid and/or a solid) that is itself absorptive and/or that contains a dye or other absorptive additive. Layer 120 can be contained within an encasement 122. In such embodiments, filter 102 includes layer 120 and encasement 122, and the absorptive medium of filter 102 corresponds to layer 120. In other embodiments, an absorption filter may contain one or more layers of material adjacent one or more non-absorptive layers, in which case the absorptive layer(s) would correspond to the absorptive medium. In other embodiments, the absorption filter is made of a single absorptive material, such as a solid article (e.g., a glass disc) containing a dye, in which case the boundaries of the absorptive medium and the absorption optical filter would be the same.

In certain embodiments, the absorption filter (e.g., the absorptive medium of the absorptive filter) comprises a matrix material and an additive dispersed within the matrix material and configured to absorb at least one wavelength of electromagnetic radiation. One non-limiting example of a suitable matrix material is a polymer, such as a thermoset polymer. A thermoset polymer is generally understood to be a polymer that is irreversibly cured through heat, a chemical reaction, or irradiation. The thermoset polymer may comprise, for example, an epoxy. An epoxy is a polymeric or semi-polymeric material that contains at least one epoxide group. Thermoplastic polymers can also be used as an absorption filter matrix material, in certain embodiments. Other examples of absorption filter matrix materials include, glasses, ceramics, and the like. In some embodiments, the additive dispersed within the matrix material is a dye. The additive may also comprise, for example, chemicals with absorptive properties (e.g., potassium iodide, potassium dichromate, and the like), absorptive nanoparticles, and the like.

In certain embodiments, optical filter 102 is an interference filter. An interference filter is generally understood by one of ordinary skill in the art to be a filter that operates by reflecting at least one wavelength of electromagnetic radiation and transmitting at least one other wavelength of electromagnetic radiation. The interference filter may comprise, for example, multiple layers of dielectric or metallic materials having different refractive indices.

In some embodiments, the filter is configured to filter (e.g., absorb or attenuate via interference) at least one wavelength of visible electromagnetic radiation and/or at least one wavelength of infrared electromagnetic radiation and/or at least one wavelength of ultraviolet electromagnetic radiation. In certain embodiments, the filter is configured to filter (e.g., absorb and/or attenuate via interference) at least one wavelength of electromagnetic radiation from about 200 nm to about 1 mm, at least one wavelength of electromagnetic radiation from about 200 nm to about 350 nm, at least one wavelength of electromagnetic radiation from about 350 nm to about 800 nm, and/or at least one wavelength of electromagnetic radiation from about 800 nm to about 1 mm.

In some embodiments, when a filter filters (e.g., absorbs or attenuates via interference) a wavelength(s) of electromagnetic radiation, the intensity of the filtered wavelength(s) of electromagnetic radiation that is transmitted through the filter is less than about 10% (or less than about 5%, less than about 1%, or less than about 0.1%) of the intensity of the electromagnetic radiation originally incident upon the filter. In some embodiments, when a filter filters (e.g., absorbs or attenuates via interference) a wavelength(s) of electromagnetic radiation, the intensity of the filtered electromagnetic radiation that is transmitted through the filter is 0. In the case of absorptive filters, the amount of electromagnetic radiation filtered by the filter can depend, in some embodiments, upon the type of material in the absorptive medium of the absorptive filter. For example, in some embodiments, the absorptive medium of the absorptive filter can be configured to absorb at least about 90% (or at least about 95%, at least about 99%, at least about 99.9%, or 100%) of at least one wavelength of electromagnetic radiation.

Diffraction grating 104 can be of any suitable type. Generally, the diffraction grating is configured such that it diffracts at least a portion of electromagnetic radiation incident upon the diffraction grating. Diffraction grating 104 can be a reflective diffraction grating or a transmissive diffraction grating. Reflective diffraction gratings produce diffracted electromagnetic radiation that is reflected from the surface of the grating on which the electromagnetic radiation is incident. Transmissive diffraction gratings produce diffracted electromagnetic radiation that is transmitted through the diffraction grating (i.e., passed from one side of the grating to the other).

Diffraction can be achieved by the diffraction grating by directing incident electromagnetic radiation onto diffraction features. In certain embodiments, the diffraction grating may comprise a plurality of periodic (regularly spaced) and/or quasiperiodic (non-regularly spaced) grating features that produce the diffracted radiation when electromagnetic radiation is incident upon the grating features. The diffraction grating may comprise any suitable type of grating features known to those of ordinary skill in the art. For example, in some embodiments, the grating features include periodic or quasiperiodic protrusions extending from a surface and/or periodic or quasiperiodic indentations into a surface of the diffraction grating. In some embodiments, the grating features correspond to opaque, periodic (or quasiperiodic) rulings arranged within a transparent substrate. In certain embodiments, the grating features correspond to a plurality of domains with different indices of refraction, as might be observed in a volume phase diffraction grating. Diffraction gratings made using other types of grating features are known to those of ordinary skill in the art, and can be used in association with the articles, systems, and methods described herein. In some embodiments, the grating features in the diffraction grating are substantially parallel and/or concentric. In some embodiments, the diffraction grating may comprise a plurality of substantially linear periodic grating features. In some embodiments, the diffraction grating may comprise a plurality of curved grating features.

Figure 1C:
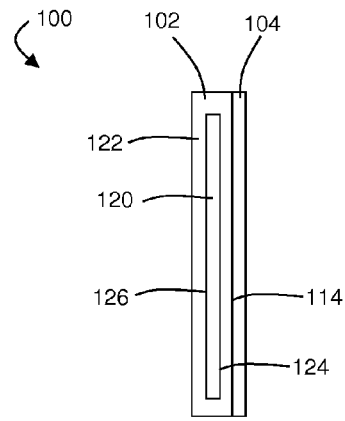
Figure 1D:
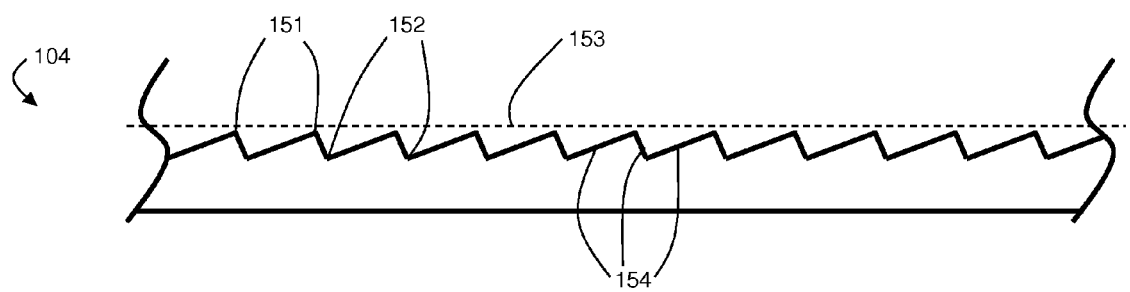
FIG. 1D is, according to some embodiments, a cross-sectional schematic illustration of a diffraction grating.

In some embodiments, the diffraction grating comprises a grating substrate and a reflective layer positioned over the grating substrate. An intermediate material (e.g., an adhesive) can be positioned, in certain embodiments, between the grating substrate and the reflective layer. In some embodiments, the intermediate material can be used to adhere the reflective layer to the grating substrate. In certain embodiments, the reflective layer (and/or the intermediate material between the reflective layer and the grating substrate) comprises a plurality of grating features (e.g., a plurality of ridges and grooves, as illustrated in FIG. 1D). The grating substrate can be made of a number of suitable materials including, but not limited to, glass, ceramic, metal, and/or a polymer. In some embodiments, the grating substrate comprises glass. The reflective surface can also be made from a variety of materials. In some embodiments, the reflective surface comprises a metal, such as aluminum. The optional intermediate material can be, for example, polymeric (e.g., an epoxy, such as a transparent epoxy).

The diffraction grating can be formed using any of a variety of suitable processes. In some embodiments, the diffraction grating is fabricated by forming the reflective layer in a mold. The mold may include, for example, a negative imprint of the grating features that are to be included in the reflective layer. The reflective layer can be deposited within the mold, for example, using a deposition process (e.g., an evaporative deposition process). In some such embodiments, the reflective layer can form a conformal coating over the mold, such that the grating features from the mold are translated to the reflective layer. In some embodiments, an intermediate material (e.g., an adhesive material, which may be transparent, such as a transparent thermoset material) can be positioned over the reflective layer. In some embodiments, the grating substrate may then be positioned over the intermediate material. In certain embodiments, after the grating substrate has been positioned over the intermediate material, the intermediate material can be hardened (e.g., cured), thus securing the reflective layer to the grating substrate. In some embodiments, the grating can be removed from the mold and integrated with an optical filter, as described elsewhere herein.

Methods of making the diffraction gratings described herein are not limited to those described above. For example, in some embodiments, the diffraction grating is assembled by providing the grating substrate and the reflective layer (including grating features) separately, and adhering the reflective layer to the grating substrate by positioning the intermediate material between the grating substrate and the reflective layer. The intermediate material can then be hardened to adhere the reflective layer to the grating substrate. In some embodiments, the diffraction grating is assembled by positioning the intermediate material over the grating substrate. Diffraction grating features can subsequently be formed into the intermediate material, after which the reflective layer can be positioned over the intermediate material. The reflective layer can be positioned over the intermediate material, for example, by coating reflective material (e.g., a metal such as aluminum) over the intermediate material. In some embodiments, the reflective layer can be positioned over the intermediate material by pressing a metal foil onto the intermediate material.

The diffraction grating comprises a grating surface, in certain embodiments. Generally, the term "grating surface" is used to refer to the surface defined by the periodic grating features in the diffraction grating. For example, if rulings, protrusions, or indentations are formed on a top surface of the diffraction grating, the top surface of the diffraction grating would correspond to the grating surface. Grating surfaces are generally understood by those skilled in the art to be geometric surfaces. In this context, the geometric surface of an article (e.g., a diffraction grating, a filter, etc.) refers to the surface defining the outer boundaries of the article when analyzed at substantially the same scale as the maximum cross-sectional dimension of the article. Generally, the external geometric surface of an article does not include the internal surfaces, such as the surfaces defined by grating features (e.g., ridges, grooves, etc.) present on a diffraction grating. As one non-limiting example, in FIG. 1D, grating 104 comprises ridges 151 and grooves 152. In this example, the grating surface of grating 104 corresponds to geometric surface 153, illustrated as a dotted line in FIG. 1D. Surface portions 154, on the other hand, do not constitute parts of the grating surface. The grating surface can be planar or non-planar (e.g., substantially cylindrical or otherwise curved).

Generally, the direction along which the diffraction grating diffracts a particular wavelength of incident electromagnetic radiation will depend upon the angle at which the incident electromagnetic radiation approaches the grating surface and the wavelength of the incident electromagnetic radiation.

The diffraction grating can be used to produce zero-order diffracted electromagnetic radiation and non-zero-order diffracted electromagnetic radiation. Zero-order diffracted electromagnetic radiation generally behaves according to the laws of reflection (in the case of a reflective diffraction grating) and refraction (in the case of a transmissive refraction grating), as it would if the diffraction grating were a minor or a lens, respectively. Non-zero-order diffracted electromagnetic radiation generally refers to diffracted electromagnetic radiation that is transmitted at an angle relative to the zero-order diffracted electromagnetic radiation. Non-zero-order diffracted electromagnetic radiation includes first order, second order, third order, and any higher order diffracted electromagnetic radiation.

In some embodiments, the diffraction grating and the optical filter can be configured such that the surface and/or interfaces across which electromagnetic radiation is transmitted are substantially parallel to each other. For example, in some embodiments, the optical filter comprises a first external surface facing the diffraction grating and a second external surface opposite the first external surface. Referring to FIG. 1A, for example, optical filter 102 comprises first external surface 110 (which faces diffraction grating 104) and second external surface 112 (which is opposite first external surface 110). As illustrated in FIG. 1A, external surface 110 is in direct contact with diffraction grating 104. In other embodiments, external surface 110 can be in indirect contact with diffraction grating 104, as illustrated, for example, in FIG. 1B. In FIG. 1B, external surface 110 is attached to diffraction grating 104 via intermediate material 106 (e.g., an adhesive). In some embodiments, the first and/or second external surfaces of the optical filter are parallel, within 2 degrees, to the grating surface of the diffraction grating. For example, referring to FIGS. 1A and 1B, diffraction grating 104 includes grating surface 114, and external surfaces 110 and 112 of optical filter 102 are substantially parallel to grating surface 114.

Those of ordinary skill in the art would understand that, for the purposes of determining the parallelism of a non-grating surface (e.g., an external surface of a filter) relative to the grating surface of a diffraction grating, the grating surface corresponds to the geometric surface defined by the diffraction grating, as described above. Similarly, for the purposes of determining the parallelism of a non-grating surface relative to the grating surface of a diffraction grating, the non-grating surface corresponds to the geometric surface defined by the outer boundaries of the non-grating element (e.g., a filter).

In certain embodiments, the diffraction grating and the absorptive medium of an absorptive optical filter can be configured such that at least one outer surface of the absorptive medium is substantially parallel to the grating surface of the diffraction grating. For example, in some embodiments, the absorptive medium of an optical filter comprises a first outer surface facing the diffraction grating and a second outer surface opposite the first outer surface. Referring to FIG. 1C, for example, absorptive medium 120 of optical filter 102 comprises first outer surface 124 (which faces diffraction grating 104) and second outer surface 126 (which is opposite first outer surface 124). In some embodiments, the first and/or second outer surfaces of the absorptive material within the absorption filter are parallel, within 2 degrees, to the grating surface of the diffraction grating. For example, referring to FIG. 1C, diffraction grating 104 includes grating surface 114, and outer surfaces 124 and 126 of absorptive medium 120 are substantially parallel to grating surface 114.

As illustrated in FIG. 1C, outer surface 124 of the absorption medium is in indirect contact with diffraction grating 104. In other embodiments, outer surface 124 can be in indirect contact with diffraction grating 104. For example, in embodiments in which optical filter 102 of FIG. 1A comprises a single solid absorptive material, the outer surfaces of the absorptive medium would spatially correspond to the external surfaces of the optical filter, and therefore, the outer surface of the absorptive material in filter 102 of FIG. 1A would be in direct contact with diffraction grating 104.

As noted elsewhere, in certain embodiments, the optical filter and the diffraction grating are in indirect contact through an intermediate material. In some such embodiments in which the optical filter comprises an absorption filter, the intermediate material may be "index matched" with the absorptive medium of the optical filter. Such index matching can be advantageous as it reduces the degree to which interfacial effects between the intermediate material and the absorptive medium of the optical filter affect the pathway of the electromagnetic radiation transmitted through the intermediate material and the optical filter. In some embodiments, the absorptive medium within the optical filter has a first index of refraction, and the intermediate material has a second index of refraction. In some such embodiments, the difference between the index of refraction of the absorptive medium of the optical filter and the index of refraction of the intermediate material is about 0.3 or less, about 0.2 or less, about 0.1 or less, or about 0.05 or less at at least one wavelength of electromagnetic radiation (e.g., at least one wavelength of visible, ultraviolet, and/or infrared electromagnetic radiation). In some embodiments, the difference between the index of refraction of the absorptive medium of the optical filter and the index of refraction of the intermediate material is about 0.3 or less, about 0.2 or less, about 0.1 or less, or about 0.05 or less at all wavelengths of visible, ultraviolet, and/or infrared electromagnetic radiation. In certain embodiments, the index matching described above can be achieved for at least one wavelength of electromagnetic radiation from about 200 nm to about 1 mm, at least one wavelength of electromagnetic radiation from about 200 nm to about 350 nm, at least one wavelength of electromagnetic radiation from about 350 nm to about 800 nm, and/or at least one wavelength of electromagnetic radiation from about 800 nm to about 1 mm. Such index matching can be achieved using a variety of materials as intermediate materials. For example, immersion oils can be index matched to glasses, polymers, ceramics, and a variety of other types of materials. Water, glycerol, adhesives (e.g., epoxies such as UV curable epoxies), xylene, and glass can also be used to index match a variety of materials which can be used to form the absorptive medium of the optical filter such as glasses, polymers, ceramics, and the like.

In some embodiments, the combination of the optical filter and the diffraction grating (e.g., article 100 in FIGS. 1A and 1B or any of the other combination optical filter and diffraction gratings described herein) may be relatively rigid. For example, in some embodiments, the article comprising the optical filter and the diffraction grating can have a modulus of rigidity of at least about 10 GPa. In certain embodiments, the article comprising the optical filter and the diffraction grating has a modulus of rigidity of less than about 1000 GPa, or less than about 500 GPa. The modulus of rigidity (also sometimes referred to as the shear modulus) is known to those of ordinary skill in the art, and refers to the ratio of shear stress to the shear strain. The modulus of rigidity of a combination filter grating can be determined, for example, by applying a shear stress to the combination filter grating at one end (and across the components of the combination filter grating) in a direction perpendicular to the grating surface while mechanically fixing the other end of the combination filter grating in place, and measuring the displacement of the area of the grating on which the force is applied.

In some embodiments, the optical filter and/or the diffraction grating can have a modulus of rigidity of at least about 10 GPa. In certain embodiments, the optical filter and/or the diffraction grating can have a modulus of rigidity of less than about 1000 GPa, or less than about 500 GPa. In certain embodiments, the largest single-material component, by volume, of the combination filter grating can have a modulus of rigidity of at least about 10 GPa (and/or, in some embodiments, a modulus of rigidity of less than about 1000 GPa, or less than about 500 GPa). Such rigid articles can be made, for example, by fabricating the optical filter and/or the diffraction grating from appropriate materials. For example, in some embodiments, at least one of the optical filter and the diffraction grating comprises a ceramic such as, for example, a silicon oxide, an aluminum oxide, a magnesium oxide, a zirconium oxide, a silicon carbide, an aluminum carbide, a magnesium carbide, a zirconium carbide, a silicon nitride, an aluminum nitride, a magnesium nitride, and/or a zirconium nitride. In some embodiments, at least one of the optical filter and the diffraction grating comprises a glass such as, for example, a silicon-containing glass. In certain embodiments, at least one of the optical filter and the diffraction grating comprises a metal such as, for example, aluminum, nickel, copper, titanium, iron, and/or chromium. Composite materials (e.g., combinations of polymers, metals, glass, and/or ceramics) could also be used. Other materials suitable for making diffraction gratings and optical filters with the moduli of rigidity described herein are known to those of ordinary skill in the art.

In some embodiments, a protective layer can be attached to the filter, for example, such that the filter is positioned between the protective layer and the diffraction grating. The protective layer can ensure that the filter is not damaged, for example, during handling of the combination optical filter and diffraction grating. The protective layer can be made of a variety of suitable materials including, but not limited to, a ceramic, a glass, a polymer, or combinations of these materials. In some embodiments, the protective layer comprises glass.

Methods of making the combination filter gratings described herein are also provided. In some embodiments, the method comprises arranging an optical filter such that it is in contact with a diffraction grating.

The optical filter can have any of the properties (e.g., rigidity, absorption behavior, etc.) described elsewhere herein. For example, the optical filter can be an absorption filter, for example, configured to absorb at least one wavelength of electromagnetic radiation.

Similarly, the diffraction grating can have any of the properties described elsewhere herein. As one example, the diffraction grating can have a modulus of rigidity of at least about 10 GPa. In one set of embodiments, the diffraction grating comprises grating features arranged in a reflective layer. The reflective layer can be adhered to a grating substrate, such as a glass-containing substrate. Additional arrangements of the diffraction grating are described elsewhere herein.

In certain embodiments, arranging the optical filter such that it is in contact with the diffraction grating comprises forming the optical filter on the diffraction grating. The optical filter can be formed on the diffraction grating, for example, by applying a liquid to the diffraction grating and hardening the liquid to form the optical filter. Hardening the liquid can involve, for example, curing the liquid (e.g., curing a thermoset polymer, such as an epoxy, within the liquid). In some embodiments, hardening the liquid comprises solidifying a liquid melt. In certain embodiments, the liquid contains an absorptive additive (e.g., a dye) dispersed within a liquid carrier. The liquid carrier can comprise, for example, a thermoset polymer, such as an epoxy. In some embodiments, the liquid carrier may be hardened, trapping the absorptive additive within the solidified material.

Figure 3:
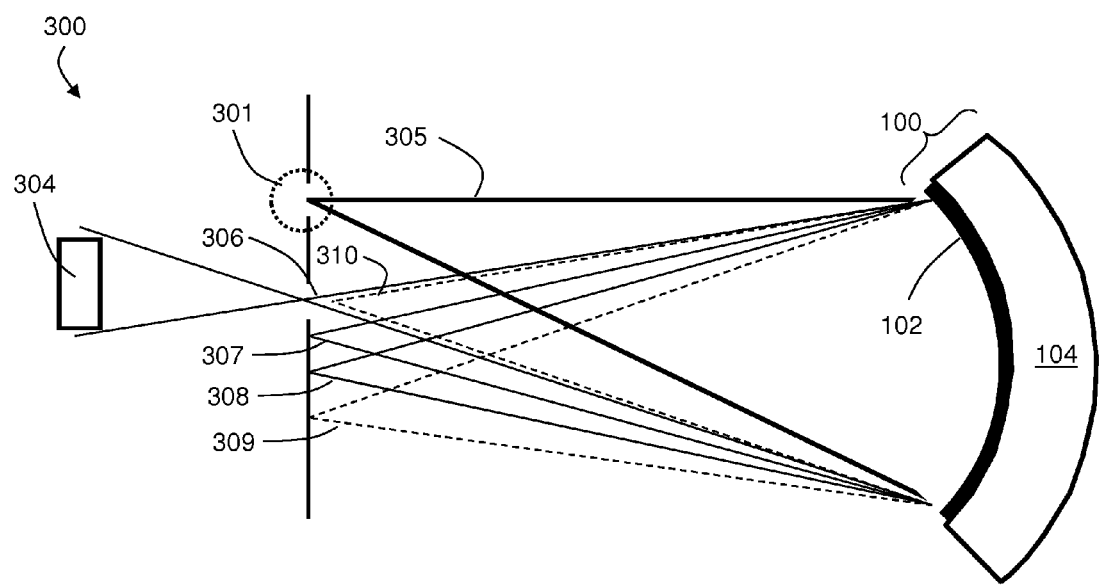
FIG. 3 is a schematic illustration of a system in which a diffraction grating in contact with an optical filter is used to direct electromagnetic radiation toward a receiver, according to some embodiments.
Figure 4:
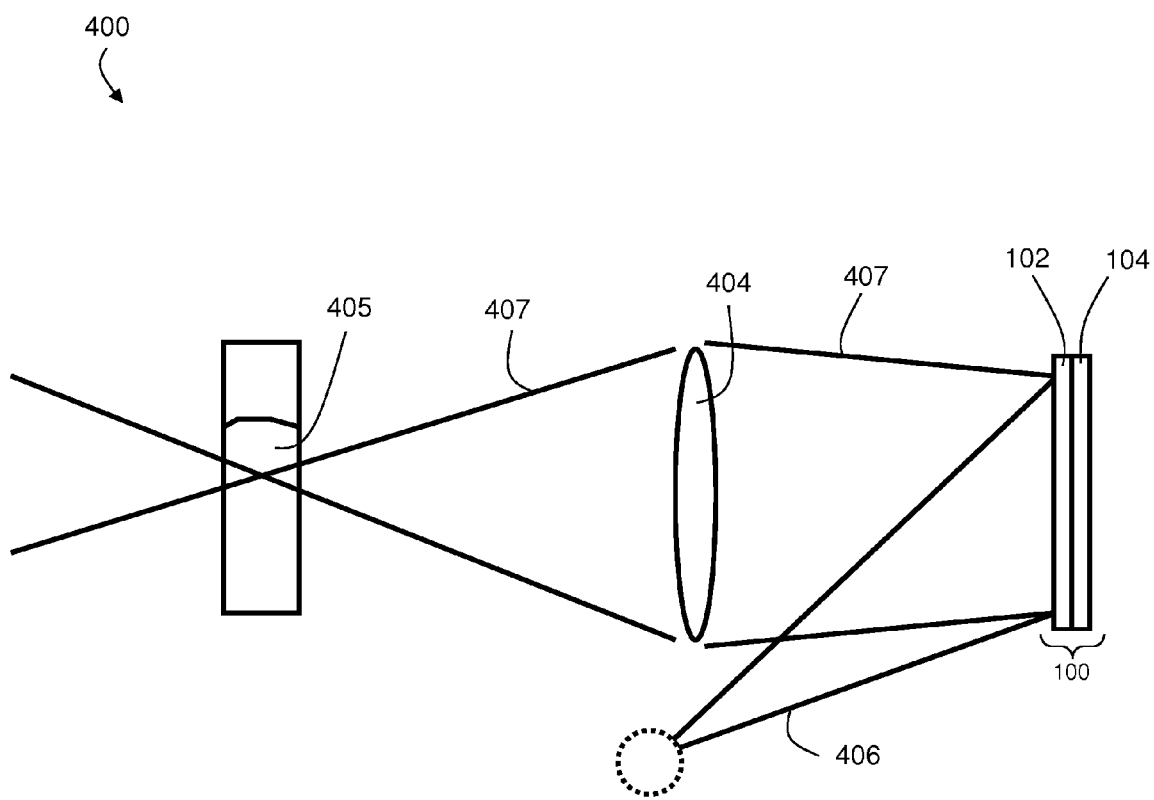
FIG. 4 is, according to some embodiments, a schematic illustration of a system in which a diffraction grating in contact with an optical filter is used to direct electromagnetic radiation toward a receiver.
Figure 5A:
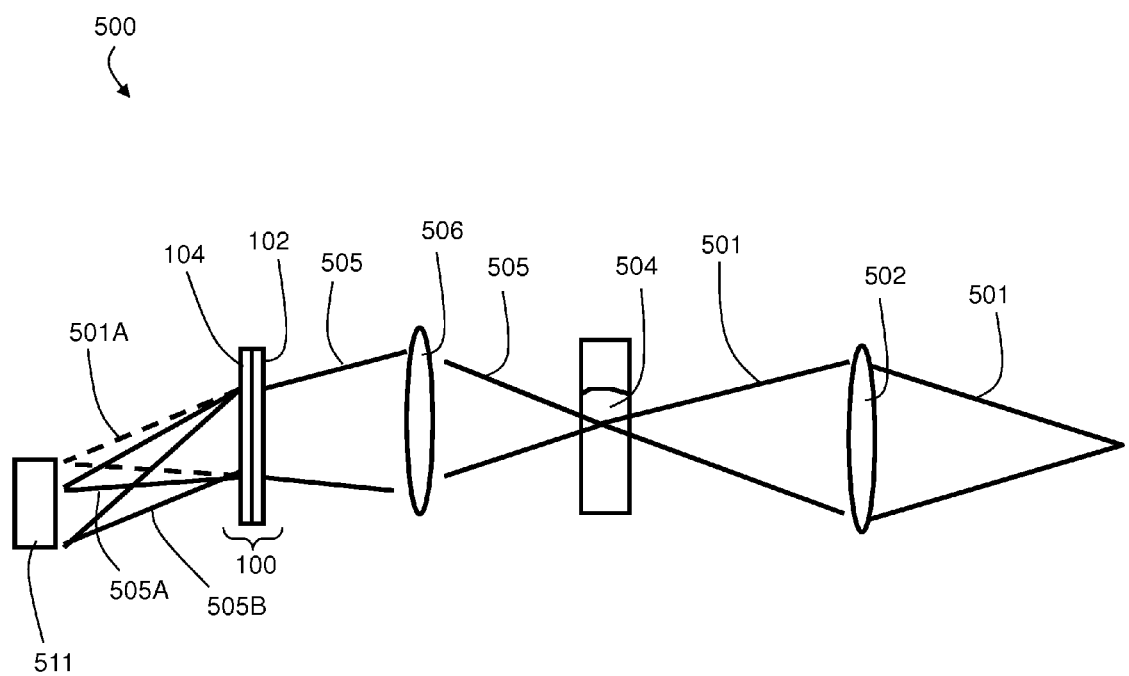
FIGS. 5A-5C are, according to certain embodiments, schematic illustrations of systems in which a diffraction grating in contact with an optical filter is used to direct electromagnetic radiation toward a receiver.

The optical filters and diffraction gratings described herein can be used (in a variety of systems and according to a variety of methods) to manipulate electromagnetic radiation such that one or more desired wavelengths (optionally from one or more predetermined locations) are transmitted to a receiver. In some embodiments, the methods and systems involve directing a first portion of electromagnetic radiation along a predetermined direction such that an article comprising an optical filter and a diffraction grating in contact with the optical filter is exposed to the first portion. The first portion of electromagnetic radiation may include electromagnetic radiation that the user of the system or method is interested in receiving (via the receiver). For example, the first portion of electromagnetic radiation may include electromagnetic radiation (e.g., of a specific wavelength) that is relevant to analyzing a particular characteristic of emitted light as might be performed, for example, in an optical spectroscopy system. One example of such a system is illustrated in FIG. 3, and is described in more detail below. As another example, the first portion of electromagnetic radiation may be useful in producing a desired effect within a sample (e.g., the first portion may be useful in treating a biological sample). One example of such a system is illustrated in FIG. 4, and is described in more detail below. In still another example, the first portion of electromagnetic radiation may correspond to electromagnetic radiation emitted from an electromagnetic-radiation-emitting sample (e.g., a photoluminescent sample), the wavelength of which may be indicative of a property of the electromagnetic-radiation-emitting-sample. One example of such a system is illustrated in FIG. 5A, which is described in more detail below.

In some embodiments, the article comprising the optical filter and the diffraction grating may also be exposed to a second portion of incident electromagnetic radiation. In certain embodiments, receipt of the second portion of electromagnetic radiation by the receiver may be undesirable. Accordingly, in some such embodiments, and as described in more detail below, the optical filter may be used to absorb and/or reflect the second portion of electromagnetic radiation such that it is not received by the receiver. The second portion of electromagnetic radiation may originate from the same source as the first portion of electromagnetic radiation, in certain embodiments. In some embodiments, the second portion of electromagnetic radiation originates from a source that is different from the source from which the first portion of electromagnetic radiation originates.

As one example, the second portion of electromagnetic radiation may include electromagnetic radiation that, after being diffracted by the diffraction grating, produces second or higher order electromagnetic radiation that overlaps with first-order electromagnetic radiation that one desires to receive via the receiver. In some such embodiments, the second portion of electromagnetic radiation is emitted from the same source as the first portion, and accordingly, the first and second portions travel with each other prior to being incident upon the diffraction grating and the filter. One example of such a system is in an optical spectrometry system in which order sorting is performed, as described in more detail in reference to FIG. 3 below. As another example, the second portion of electromagnetic radiation may include a wavelength that is harmful to a sample (e.g., a biological sample) being treated by the first portion of electromagnetic radiation. In some such systems, the first and second portions originate from a common source. One example of such a system is illustrated in FIG. 4, described in more detail below. In still another example, the second portion of electromagnetic radiation includes electromagnetic radiation used to illuminate a photoluminescent article. In some such embodiments, the first portion (e.g., emitted by the photoluminescent article) may be desirable to receive via the receiver while the second portion (e.g., emitted by a source separate from the photoluminescent article) may interfere with the reception of the first portion or otherwise be undesirable to receive via the receiver. One such example is illustrated in FIG. 5A, described in more detail below.

Figure 2:
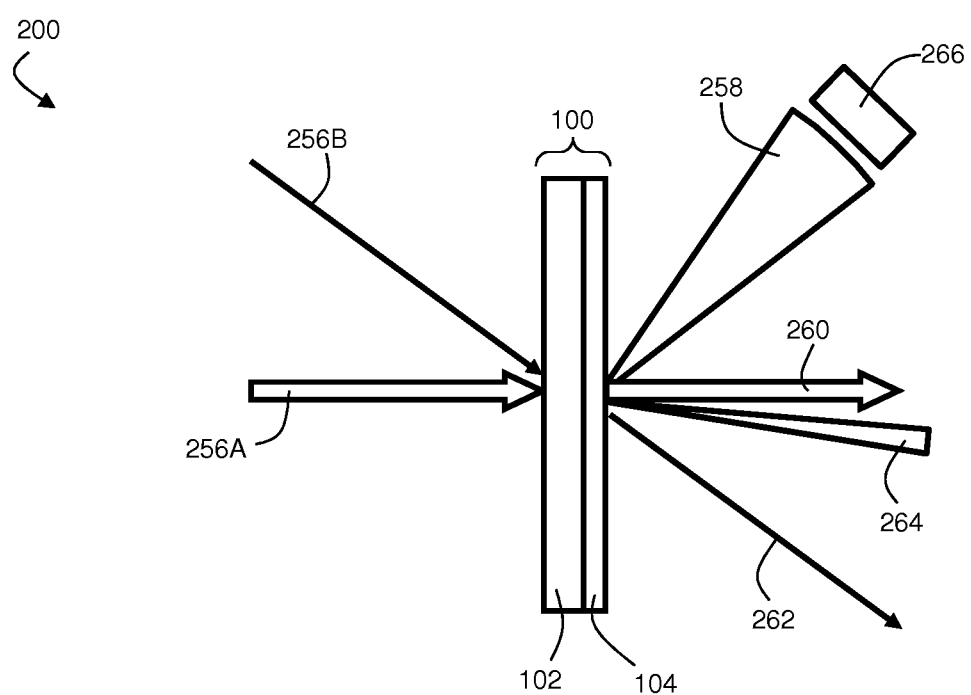
FIG. 2 is, according to certain embodiments, a schematic illustration of a system in which a diffraction grating in contact with an optical filter is used to direct electromagnetic radiation toward a receiver.

FIG. 2 is an exemplary cross-sectional schematic diagram illustrating a system 200 which illustrates a generalized method of using the combination filter gratings described herein to transmit and diffract a first portion of electromagnetic radiation and filter a second portion of electromagnetic radiation. In FIG. 2, combination filter grating 100 comprises optical filter 102 and diffraction grating 104 in contact with optical filter 102. While diffraction grating 104 and optical filter 102 are illustrated as being in direct contact in FIG. 2, it should be understood that, in other embodiments, diffraction grating 104 and optical filter 102 can be in indirect contact. Combination filter grating 100 in FIG. 2 can correspond to any of articles 100 described elsewhere herein. Generally, the term "combination filter grating" is used herein to refer to articles (such as articles 100) which contain an optical filter and a diffraction grating in (direct or indirect) contact with the optical filter.

The combination filter grating 100 can be exposed to incident electromagnetic radiation 256. Incident electromagnetic radiation 256 can comprise a first portion 256A and a second portion 256B. As noted above, first portion 256A can include electromagnetic radiation the user of the system wishes to receive using a receiver (illustrated in receiver 266 in FIG. 2).

First portion 256A of electromagnetic radiation 256 can be transmitted along a direction prior to being exposed to combination filter grating 100. For example, referring to FIG. 1B, first portion 256A of electromagnetic radiation 256 can be transmitted along the direction of the arrow illustrated in association with label 256A. In certain embodiments, first portion 256A corresponds to at least part of (or all of) the electromagnetic radiation emitted from a source in a particular direction.

In some embodiments, the direction along which first portion 256A is transmitted is predetermined and/or adjusted. This can result in first portion 256A being transmitted along a predetermined or adjusted pathway. In certain embodiments, transmitting first portion 256A along a predetermined and/or adjusted pathway may be accomplished using a directional source.

For example, in certain embodiments, first portion 256A is emitted from a directional source. Generally, a directional source is one that anisotropically emits electromagnetic radiation. When directional sources are employed to produce first portion 256A, the direction along which first portion 256A is transmitted may be established by adjusting the direction of the directional source.

Figure 6A:
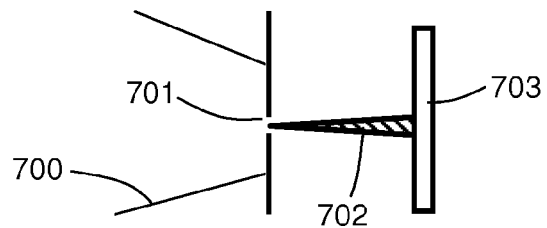
FIGS. 6A-6D are exemplary cross-sectional schematic diagrams illustrating various forms of directional electromagnetic radiation.
Figure 6B:
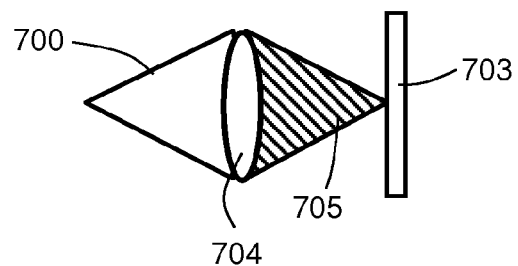
Figure 6C:
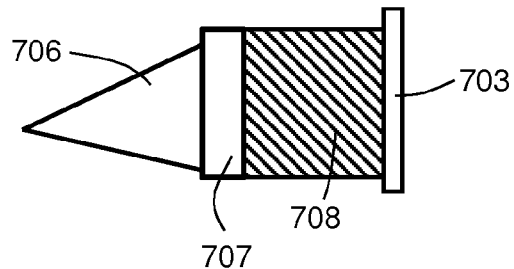
Figure 6D:
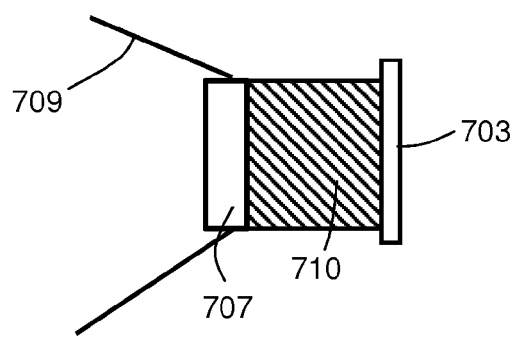

As another example, in some embodiments, first portion 256A originates from a non-directional source (e.g., an isotropic source) or a source with a different directionality than the directionality of first portion 256A prior to being incident upon the optical filter and the diffraction grating. In some such embodiments, first portion 256A is made to be directional by passing first portion 256A through an optical element (e.g., a lens, an aperture, etc.) to the exclusion of other electromagnetic radiation from the source. As one particular example, in certain embodiments, first portion 256A corresponds to part of an emission from an isotropic or anisotropic source, from which first portion 256A has been separated by transporting first portion through an aperture. An example of such an embodiment is illustrated in FIG. 6A, which shows electromagnetic radiation 700 passing through aperture 701 to form directional beam 702 that is incident upon optical filter 703. FIG. 6B shows an example of one embodiment in which electromagnetic radiation 700 is transmitted through lens 704 to form directional converging beam 705 that is incident upon optical filter 703. FIG. 6C shows an example of one embodiment in which a diverging beam of electromagnetic radiation 706 passes through collimator 707 (e.g., a collimating lens) to form collimated radiation beam 708. A collimated beam is understood to be one in which the rays are approximately parallel. FIG. 6D shows an example of one embodiment in which a converging beam of electromagnetic radiation 709 passes through collimator 707 (e.g., a collimating lens) to form collimated radiation beam 710.

In certain embodiments, first portion 256A can be directional such that the largest spatial angle defined by first portion 256A is relatively small. For example, in certain embodiments, the largest spatial angle defined by first portion 256A can be less than about 30°, less than about 15°, less than about 10°, less than about 5°, or less than about 1°. For example, in FIG. 6A, the largest spatial angle defined by electromagnetic radiation 702 is about 1°. In FIG. 6B, the largest spatial angle defined by electromagnetic radiation 705 is about 40°. In FIGS. 6C and 6D, the largest spatial angles defined by electromagnetic radiation 708 and 710 are approximately 0° (because the beams of electromagnetic radiation within 708 and 710 are substantially parallel).

As noted above, the direction along which first portion 256A is transmitted may be predetermined and/or adjusted, in certain embodiments. The direction along which first portion 256A is transmitted may be predetermined, for example, by installing (e.g., at the site at which system 200 is assembled or during a repair or replacement procedure) a source of first portion 256A that emits radiation in a particular direction or by installing a directing optical element (e.g., a lens, an aperture, etc.) such that it shapes the pathway of first portion 256A in a particular direction. As another example, the direction along which first portion 256A is transmitted may be adjusted, for example, by moving the position of a source of first portion 256A that emits radiation in a particular direction or by moving a directing optical element that is used to shape the pathway of first portion 256A in a particular direction.

Combination filter grating 100 can also be exposed to second portion 256B of electromagnetic radiation. Second portion 256B can originate from the same source as first portion 256A or from a different source than first portion 256A. In the exemplary embodiment illustrated in FIG. 2, second portion 256B is transmitted in a direction indicated by the arrow associated with label 256B prior to being incident upon combination filter grating 100, which is different than the direction in which first portion 256A is transmitted. However, in other embodiments, first and second portions 256A and 256B can be transmitted in the same direction as first portion 256A prior to second portion 256B being incident upon combination filter grating 100. In certain such embodiments, second portion 256B may spatially overlap with first portion 256A prior to interacting with combination filter grating 100.

In certain embodiments, the optical filter can be configured to absorb (e.g., using an absorptive filter) and/or reflect (e.g., using an interference filter) at least some of (and, in certain embodiments, at least 90% of, or all of) the second portion of the electromagnetic radiation incident upon the filter. By absorbing the second portion of electromagnetic radiation, the optical filter can inhibit or prevent the reception of the second portion of electromagnetic radiation by the receiver. Referring back to FIG. 2, in certain embodiments, optical filter 102 absorbs and/or reflects at least some of second portion 256B of the incident electromagnetic radiation. For example, in some embodiments, optical filter 102 can be configured to absorb and/or reflect one or more wavelengths within second portion 256B such that such wavelengths are not received by receiver 266, as described in more detail elsewhere herein.

In certain embodiments, the optical filter can be configured to transmit at least some of (and, in certain embodiments, at least 90% of, or all of) the first portion of the electromagnetic radiation incident upon the optical filter. By transmitting the first portion of electromagnetic radiation, the optical filter can allow the receiver to receive the first portion, which can allow for the performance of a variety of desirable functions (e.g., analysis, treatment, detection (ocular or otherwise), etc.) described elsewhere herein. Referring back to FIG. 2, in some embodiments, optical filter 102 transmits at least some of first portion 256A of the incident electromagnetic radiation.

In some embodiments, the optical filter is configured such that electromagnetic radiation that would interfere with the function of the receiver is eliminated (e.g., absorbed and/or reflected) by the optical filter. In one particular example, undesirable electromagnetic radiation that, in the absence of the filter, would overlap a wavelength(s) the receiver is configured to receive can be absorbed and/or reflected by the filter such that the undesirable electromagnetic radiation does not interfere with the exposure of the receiver to the wavelength(s) the receiver is configured to receive.

The diffraction grating may be configured, according to certain embodiments, to produce zero-order diffracted electromagnetic radiation and non-zero-order diffracted electromagnetic radiation. For example, referring to FIG. 2, diffraction grating 104 can produce, from first portion 256A of the incident electromagnetic radiation, non-zero-order diffracted electromagnetic radiation 258. The non-zero-order diffracted electromagnetic radiation can correspond to first order, second order, third order, fourth order, and/or higher order diffracted electromagnetic radiation. Diffraction grating 104 may also produce zero-order diffracted electromagnetic radiation 260 from first portion 256A. In some embodiments, diffraction grating may produce zero-order electromagnetic radiation 262 from second portion 256B and non-zero-order electromagnetic radiation 264 from second portion 256B.

While FIG. 2 illustrates an embodiment in which first portion 256A is first incident upon optical filter 102 and subsequently incident upon diffraction grating 104, the order of the optical filter and the diffraction grating may be reversed such that first portion 256A is first incident upon diffraction grating 104 and subsequently incident upon optical filter 102.

FIGS. 7A-7D are cross-sectional schematic illustrations showing various arrangements of the optical filter and the diffraction grating that may be used in association with the embodiments described herein. It is noted that, for purposes of clarity, optical filter 102 and diffraction grating 104 are illustrated as not being in contact with each other in FIGS. 7A-7D. However, as used according to certain embodiments, optical filter 102 and diffraction grating 104 would be in contact with each other (directly or indirectly) but otherwise arranged as illustrated in FIGS. 7A-7D.

Figure 7A:
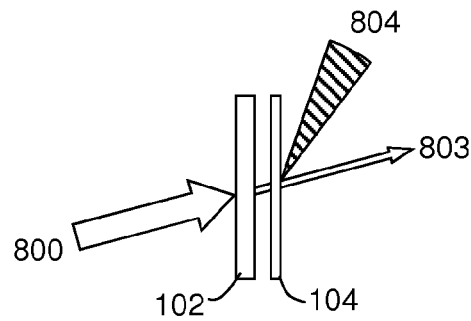
FIGS. 7A-7D are, according to certain embodiments, cross-sectional schematic diagrams illustrating various spatial arrangements of diffraction gratings and optical filters.
Figure 7B:
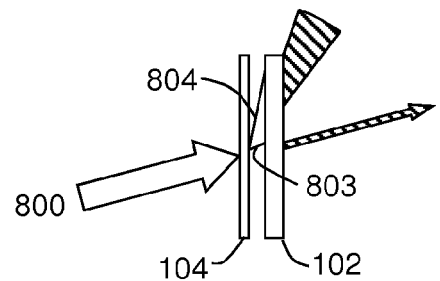
Figure 7C:
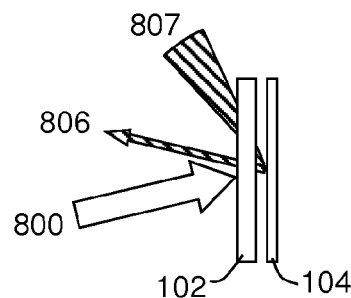
Figure 7D:
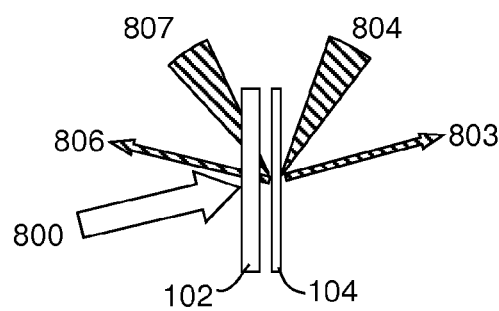

FIG. 7A illustrates an embodiment in which electromagnetic radiation 800 is first incident upon optical filter 102, filtered, and subsequently incident upon transmissive diffraction grating 104, resulting in zero-order diffracted electromagnetic radiation 803 and non-zero-order diffracted electromagnetic radiation 804. In FIG. 7B, electromagnetic radiation 800 is first incident upon transmissive diffraction grating 104, resulting in zero-order diffracted electromagnetic radiation 803 and non-zero-order diffracted electromagnetic radiation 804, which are subsequently incident on optical filter 102. FIG. 7C illustrates an embodiment in which electromagnetic radiation 800 is first incident upon optical filter 102, resulting in some portion that is subsequently incident upon reflective diffraction grating 104, resulting in reflected zero-order diffracted electromagnetic radiation 806 and reflected non-zero-order diffracted electromagnetic radiation 807. FIG. 7D illustrates an embodiment in which electromagnetic radiation 800 is first incident upon optical filter 102, resulting in some portion that is subsequently incident upon diffraction grating 104. Diffraction grating 104 is both reflective and transmissive and results in transmitted zero-order diffracted electromagnetic radiation 803 and transmitted non-zero-order diffracted electromagnetic radiation 804 and reflected zero-order diffracted electromagnetic radiation 806 and reflected non-zero-order diffracted electromagnetic radiation 807.

In certain embodiments, the receiver (e.g., receiver 266 in FIG. 2) can be configured to receive at least a portion of the non-zero-order diffracted electromagnetic radiation (e.g., 258 in FIG. 2) produced from the first portion of the electromagnetic radiation incident upon the optical filter and the diffraction grating. Some embodiments comprise arranging the receiver and the direction along which the first portion of electromagnetic radiation is transmitted relative to each other such that non-zero-order diffracted electromagnetic radiation produced by the diffraction grating from the first portion of electromagnetic radiation is incident upon the receiver. For example, referring to FIG. 2A, certain embodiments involve arranging receiver 266 and the direction along which first portion 256A is transmitted prior to being exposed to combination filter grating 100 (indicated by the arrow associated with first portion 256A in FIG. 1B) relative to each other for the purpose of directing non-zero-order diffracted electromagnetic radiation 258 produced from first portion 256A of incident electromagnetic radiation 256 onto receiver 266.

Arranging the receiver and the direction of first portion of electromagnetic radiation relative to each other may be accomplished in a number of ways. The position of the receiver and the direction of the first portion of electromagnetic radiation may be moved relative to each other, for example, by altering the position of the receiver while the direction of the first portion of electromagnetic radiation is fixed, by altering the direction of the first portion of the electromagnetic radiation while the position of the receiver is fixed, or by altering both the position of the receiver and the direction of the first portion of the electromagnetic radiation. Referring to FIG. 2, positioning receiver 266 and the direction of first portion 256A relative to each other may involve setting and/or adjusting the position of receiver 266, setting and/or adjusting the direction along which first portion 256A is transmitted prior to being incident upon filter grating combination 100, or both. For example, in some embodiments, the direction along which first portion 256A is transmitted prior to being incident upon filter grating combination 100 is substantially fixed, and positioning receiver 266 and the direction of first portion 256A relative to each other involves setting and/or adjusting the position of receiver 266. In other embodiments, the position of receiver 266 is substantially fixed, and positioning receiver 266 and the direction of first portion 256A relative to each other involves setting and/or adjusting the direction along which first portion 256A is transmitted prior to being incident upon filter grating combination 100. In still other embodiments, positioning receiver 266 and the direction of first portion 256A relative to each other involves both setting and/or adjusting the position of receiver 266 and setting and/or adjusting the direction along which first portion 256A is transmitted prior to being incident upon filter grating combination 100.

In some embodiments, the position of the receiver may be set and/or adjusted based at least in part on the direction of the first portion of electromagnetic radiation, the location of the diffraction grating, a wavelength of electromagnetic radiation within the first portion (e.g., the wavelength(s) the receiver is configured to receive) and/or the orientation of the diffraction grating. As one particular example, a desired position of the receiver may be calculated (e.g., taking into account any or all of the direction of the first portion of electromagnetic radiation, the location of the diffraction grating, a wavelength within the first portion of electromagnetic radiation, and/or the orientation of the diffraction grating), and the receiver may subsequently be positioned or otherwise moved such that it is located in the calculated desired position. In some embodiments, the direction of the first portion of electromagnetic radiation may be set and/or adjusted based at least in part on the location of the receiver, a wavelength of electromagnetic radiation within the first portion (e.g., the wavelength(s) the receiver is configured to receive), the location of the diffraction grating, and/or the orientation of the diffraction grating. As one particular example, a desired angle of incidence between the first portion of electromagnetic radiation may be calculated (e.g., taking into account any or all of the location of the diffraction grating, the orientation of the diffraction grating, a wavelength within the first portion of electromagnetic radiation, and/or the position of the receiver), and the direction of the first portion of electromagnetic radiation may subsequently be set or adjusted such that it is pointed in the calculated direction. In certain such embodiments, the calculations described above may involve using a priori knowledge of one or more of the position of the receiver, the direction of the first portion of electromagnetic radiation, the location of the diffraction grating, a wavelength of electromagnetic radiation within the first portion (e.g., the wavelength(s) the receiver is configured to receive), and/or the orientation of the diffraction grating. Those of ordinary skill in the art are capable of making such calculations using known formulas describing the behavior of electromagnetic radiation that interacts with diffraction gratings. As one particular example of such a calculation, when electromagnetic radiation is incident on a diffraction grating at arbitrary angle $\theta_i$, the diffracted electromagnetic radiation will have maxima at angles $\theta_m$, given by:

$$d(\sin \theta_i + \sin \theta_m) = m\lambda \quad [1]$$

wherein d is the distance between the periodically spaced grating features (i.e., the period) of the diffraction grating, m is the order of the diffracted electromagnetic radiation (e.g., m=0 for zero-order diffracted radiation, m=1 for first order, etc.), and $\lambda$ is the wavelength of the diffracted electromagnetic radiation. Accordingly, in certain embodiments, the position of the receiver and/or the direction along which first portion of the incident electromagnetic radiation is directed may be calculated using Equation 1.

In some embodiments, arranging the receiver and the direction along which the first portion of electromagnetic radiation is transmitted relative to each other may be accomplished without making a calculation and/or without a priori knowledge of one (or any) of the position of the receiver, the direction of the first portion of electromagnetic radiation, the location of the diffraction grating, a wavelength of electromagnetic radiation within the first portion (e.g., the wavelength(s) the receiver is configured to receive), and/or the orientation of the diffraction grating. For example, in certain embodiments, the position of the receiver may be substantially fixed, and the direction along which the first portion of electromagnetic radiation is transmitted may be adjusted until it is determined that the receiver has received the desired electromagnetic radiation. As another example, in some embodiments, the direction along which the first portion of electromagnetic radiation is transmitted may be fixed, and the position of the receiver may be adjusted until it is determined that the receiver has received the desired electromagnetic radiation. As yet another example, in some embodiments, both the position of the receiver and the direction along which the first portion of electromagnetic radiation is transmitted may be adjusted until it is determined that the receiver has received the desired electromagnetic radiation.

In certain embodiments, the position of the diffraction grating and/or the orientation of the grating surface of the diffraction grating may be set and/or adjusted (e.g., relative to the position of the receiver and/or the direction along which the first portion of electromagnetic radiation is transmitted) such that non-zero-order diffracted electromagnetic radiation produced by the diffraction grating from the first portion of electromagnetic radiation is incident upon the receiver. In some embodiments, the position of the diffraction grating and/or the orientation of the diffraction grating surface may be set and/or adjusted by first calculating a desired diffraction grating position and/or grating surface orientation (e.g., using Equation 1). In other embodiments, the position of the diffraction grating and/or the orientation of the diffraction grating surface may be set and/or adjusted without first calculating a desired diffraction grating position and/or grating surface orientation. For example, the diffraction grating position and/or grating surface orientation may be adjusted until it is determined that the non-zero-order diffracted electromagnetic radiation from the first portion of electromagnetic radiation is incident upon the receiver.

A variety of devices can be used for receiver 266. For example, a receiver may be a sensor, an optical component, and/or an analytical sample. Non-limiting examples of sensors suitable for use as receivers include intensity detectors, heat detectors, an eye of a subject (e.g., a human subject), and a camera. Non-limiting examples of optical components include lenses, diffraction gratings, prisms, and windows that are at least partially optically transparent to the non-zero-order diffracted electromagnetic radiation. Examples of analytical samples that may be used as receivers include, but are not limited to, biological materials (e.g., a protein, a ribonucleic acid, a cellular component, a cell, at least a portion of a biological tissue, blood, and/or hair) and/or non-biological materials (e.g., a metal, a mineral, and/or a salt). In some embodiments of the invention, the sample may be photoluminescent (e.g., fluorescent or phosphorescent). Photoluminescent samples generally absorb at least one wavelength of electromagnetic radiation and emit at least one different wavelength of electromagnetic radiation.

Several examples of systems in which the combination filter gratings and/or methods described herein may be used are now described.

FIG. 3 is an exemplary cross-sectional schematic illustration of a system 300 comprising optical filter 102 and diffraction grating 104. System 300 corresponds to, according to certain embodiments, an optical spectrometer. System 300 may comprise receiver 304, which may be configured to receive one or more specific wavelengths of non-zero-order diffracted electromagnetic radiation from diffraction grating 104. In FIG. 3, electromagnetic radiation 305 is transmitted along a direction (which may be known a priori by the user) such that at least one wavelength of electromagnetic radiation 305 is incident on optical filter 102 and diffraction grating 104. In some embodiments, an optical element 301 (such as an aperture) may be used to impart directionality to electromagnetic radiation 305. In other embodiments, electromagnetic radiation 305 may originate from a directional source, and optical element 301 may not be required.

Optical filter 102 in FIG. 3 may correspond to any of the optical filters described in FIGS. 1A-1B, in FIG. 2, or elsewhere herein. In addition, diffraction grating 104 in FIG. 3 may correspond to any of the diffraction gratings described in FIGS. 1A-1B, in FIG. 2, or elsewhere herein. Optical filter 102 and diffraction grating 104 may also be associated with each other in any manner described elsewhere herein, and accordingly, the combination 100 of optical filter 102 and diffraction grating 104 in FIG. 3 can correspond to any articles 100 described elsewhere herein. As one example, while optical filter 102 and diffraction grating 104 are depicted as being curved in FIG. 3, in other embodiments they may be substantially planar.

In FIG. 3, electromagnetic radiation 305 may comprise a first portion (similar to first portion 256A described above in association with FIG. 2) and a second portion (similar to second portion 256B described above in association with FIG. 2). In FIG. 3, the first and second portions of electromagnetic radiation spatially overlap each other as they are transmitted from optical element 301 to diffraction grating 104. This may be observed, for example, when electromagnetic radiation 305 originates from a polychromatic source.

Optical filter 102 may be configured to transmit the first portion of electromagnetic radiation 305 and absorb or reflect the second portion of electromagnetic radiation 305. The use of the filter to absorb the second portion of electromagnetic radiation 305 can be beneficial, as described in more detail below.

Diffraction grating 104 can be used to diffract the first portion of electromagnetic radiation 305 transmitted by optical filter 102, producing zero-order diffracted electromagnetic radiation and non-zero-order diffracted radiation. In FIG. 3, examples of non-zero-order diffracted electromagnetic radiation from the first portion of electromagnetic radiation 305 are represented by first-order diffracted electromagnetic radiation 306, 307, and 308 (each having different wavelengths). Examples of non-zero-order diffracted electromagnetic radiation from the second portion of electromagnetic radiation 305 are represented by first-order diffracted electromagnetic radiation 309 and second-order diffracted electromagnetic radiation 310 having the same wavelength as first-order diffracted electromagnetic radiation 309.

The diffracted electromagnetic radiation may include at least one wavelength of interest that one desires to detect or otherwise receive using receiver 304. For example, in some embodiments, first-order diffracted electromagnetic radiation 306 may be a target wavelength that a user of system 300 wishes to detect using receiver 304.

In certain embodiments, the second portion of electromagnetic radiation 305 that is absorbed by optical filter 102 includes electromagnetic radiation that would—were optical filter 102 not present—spatially overlap with first-order diffracted electromagnetic radiation 306, thus interfering with the reception of electromagnetic radiation 306 by receiver 304. For example, in FIG. 3, first-order diffracted electromagnetic radiation 306 and second-order diffracted electromagnetic radiation 310 are depicted as having been diffracted at the same angle. Optical filter 102 may be configured to absorb the wavelength of electromagnetic radiation 305 that produces second-order diffracted radiation 310. When optical filter 102 is employed, receiver 304 (which may be positioned based on the spatial location of first-order diffracted electromagnetic radiation 306) does not receive second-order diffracted radiation 310, which could interfere with the reception of first-order diffracted electromagnetic radiation 306. In this way, system 300 in FIG. 3 acts as an order-sorting system, in which a non-zero-order diffracted wavelength of interest can be received by receiver 304 while avoiding overlap of other non-zero-order diffracted wavelengths with the wavelength of interest.

When system 300 is in use, the position of receiver 304 can be set according to a pre-calculated position (e.g., using Equation 1 above), in certain embodiments. In some embodiments, the position of receiver 304 could also be adjusted without performing an a priori calculation, for example, in instances where moving the receiver across a space and measuring the detected radiation is desired.

FIG. 4 is an exemplary cross-sectional schematic illustration of a system 400 comprising optical filter 102 and diffraction grating 104. System 400 can be used as, for example, a sample analysis instrument. Optical filter 102 in FIG. 4 may correspond to any of the optical filters described in FIGS. 1A-1B, in FIG. 2, or elsewhere herein. In addition, diffraction grating 104 in FIG. 4 may correspond to any of the diffraction gratings described in FIGS. 1A-1B, in FIG. 2, or elsewhere herein. Optical filter 102 and diffraction grating 104 may also be associated with each other in any manner described elsewhere herein, and accordingly, the combination 100 of optical filter 102 and diffraction grating 104 in FIG. 4 can correspond to any articles 100 described elsewhere herein.

System 400 may further comprise receiver 405, which can correspond to, for example, a sample that is to be analyzed. The position of receiver 405 can be predetermined (e.g., based on a calculation involving Equation 1 above), or can be adjusted until a desired effect is observed. Electromagnetic radiation 406 can be transmitted in a known direction such that at least a portion of the electromagnetic radiation is incident on optical filter 102 and diffraction grating 104. Optical filter 102 may be configured to absorb at least one wavelength of electromagnetic radiation 406 and transmit at least one wavelength of electromagnetic radiation 406. Diffraction grating 104 diffracts the at least one wavelength of electromagnetic radiation 406 transmitted by optical filter 102, producing diffracted electromagnetic radiation 407. Diffracted electromagnetic radiation 407 can be, in certain embodiments, transmitted and refracted through optional lens 404. In FIG. 4, lens 404 is depicted as a biconvex lens. In other embodiments, the lens may be plano-convex, convex-concave, plano-concave, or biconcave. At least one wavelength of the electromagnetic radiation 407 transmitted through lens 404 is incident upon sample 405. In system 400 illustrated in FIG. 4, optical filter 102 filters at least one wavelength from electromagnetic radiation 406 such that the filtered wavelength (which might be harmful to the sample) is not incident upon sample 405.

FIG. 5A is an exemplary cross-sectional schematic illustration of a system 500 comprising optical filter 102 and diffraction grating 104. Optical filter 102 in FIG. 5A may correspond to any of the optical filters described in FIGS. 1A-1B, in FIG. 2, or elsewhere herein. In addition, diffraction grating 104 in FIG. 5A may correspond to any of the diffraction gratings described in FIGS. 1A-1B, in FIG. 2, or elsewhere herein. Optical filter 102 and diffraction grating 104 may also be associated with each other in any manner described elsewhere herein, and accordingly, the combination 100 of optical filter 102 and diffraction grating 104 in FIG. 5A can correspond to any articles 100 described elsewhere herein.

System 500 in FIG. 5A can be used as an analyzer used to determine one or more properties of a photoluminescent sample. According to some such embodiments, electromagnetic radiation 501 is directed toward photoluminescent sample 504. At least a portion of electromagnetic radiation 501 is received by optional lens 502. At least a portion of electromagnetic radiation 501 transmitted and focused by optional lens 502 is incident upon photo-luminescent sample 504. Sample 504 absorbs at least one wavelength of electromagnetic radiation 501 and emits electromagnetic radiation 505, which has a different wavelength than electromagnetic radiation 501. In some embodiments, at least a portion of electromagnetic radiation 505 is focused through optional lens 506. At least a portion of the transmitted electromagnetic radiation 505 is incident upon optical filter 102 and diffraction grating 104. In addition, electromagnetic radiation 501 can be transmitted through sample 504, optionally through lens 502, and toward filter 102 and diffraction grating 104. In many cases, transmission of electromagnetic radiation 501 through diffraction grating 104 and toward receiver 511 is undesirable. Accordingly, in certain embodiments, filter 102 is configured to absorb wavelength(s) within electromagnetic radiation 501. In such cases, electromagnetic radiation 501A (illustrated using dotted lines in FIG. 5A) would not be present, and would not interfere with the ability of receiver 511 to detect other wavelengths of electromagnetic radiation. In addition, in some such embodiments, optical filter 102 is configured to transmit the wavelength(s) within electromagnetic radiation 505. In some such embodiments, electromagnetic radiation 505 is transmitted to diffraction grating 104, diffracted, and optionally received (e.g., in the form of diffracted electromagnetic radiation 505A and 505B in FIG. 5A) by receiver 511. In certain embodiments, receiver 511 may be positioned based on the spatial location of diffracted electromagnetic radiation 505A and/or 505B (e.g., by moving the receiver until those wavelengths are detected and/or by calculating the spatial positions of those wavelengths and moving the receiver to the calculated spatial positions).

Figure 5B:
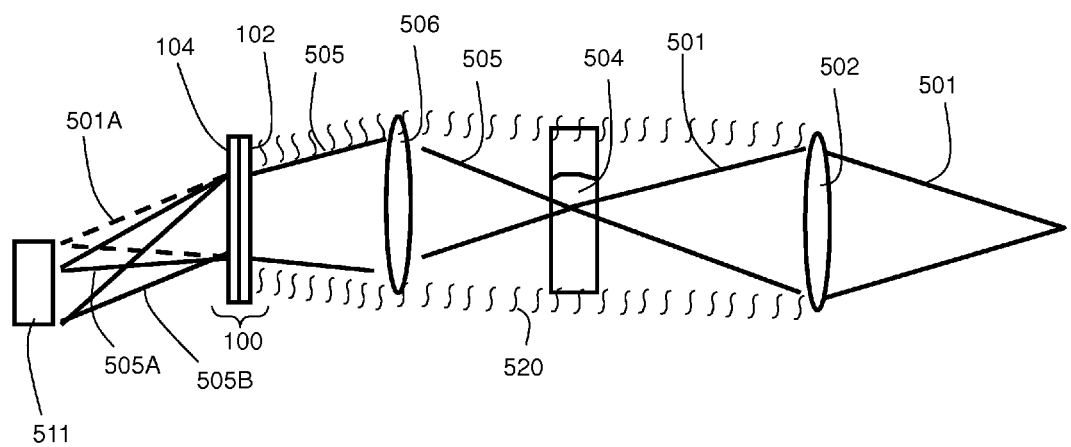

FIG. 5B is a cross-sectional schematic illustration of a system similar to system 500 in FIG. 5A. In FIG. 5B, the interaction of electromagnetic radiation 501 with lens 502 and the interaction of electromagnetic radiation 505 with lens 506 produces stray electromagnetic radiation 520, which can interfere with the reception of diffracted electromagnetic radiation 505A and 505B by receiver 511. In some such embodiments, filter 102 can be used to reduce or eliminate the interaction of stray electromagnetic radiation 520 with receiver 511.

Figure 5C:
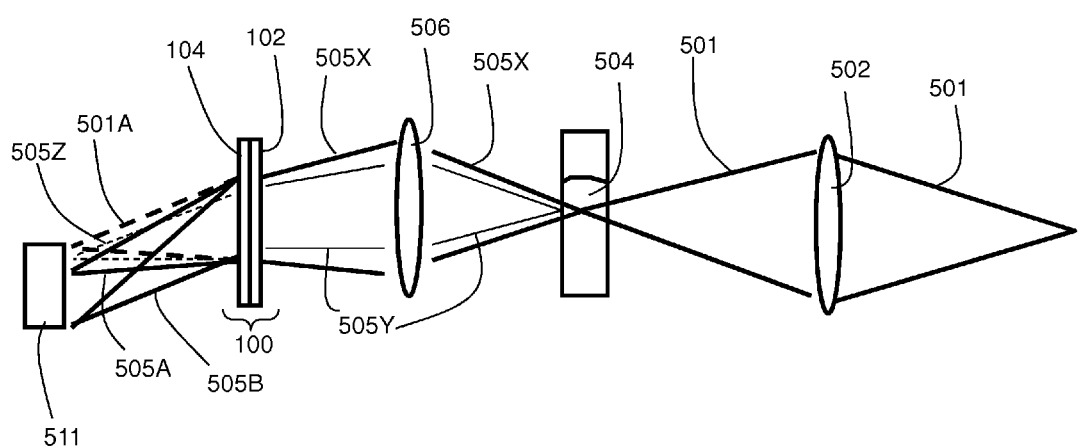

FIG. 5C is another cross-sectional schematic illustration of a system similar to system 500 in FIG. 5A. In FIG. 5C, the interaction of electromagnetic radiation 501 with photoluminescent material 504 produces a first portion of photo-emitted electromagnetic radiation 505X and a second portion of photo-emitted electromagnetic radiation 505Y. In certain embodiments, it is not desirable for receiver 511 to receive second portion 505Y. For example, second portion 505Y might be sufficiently intense that diffracted electromagnetic radiation 505Z from second portion 505Y saturates source 511 and inhibits the reception of diffracted electromagnetic radiation from first portion 505X. Accordingly, in certain embodiments, optical filter 102 in FIG. 5C is configured to absorb second portion 505Y so that first portion 505X may be diffracted and non-zero-order diffracted electromagnetic radiation from first portion 505X may subsequently be received by receiver 511.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An optical component, comprising:
a diffraction grating comprising a grating surface; and
an absorptive optical filter comprising a first outer surface in direct contact with the grating surface of the diffraction grating and a second outer surface opposite the first outer surface, the second outer surface parallel, within 2 degrees, to the grating surface of the diffraction grating;
wherein the optical component has a modulus of rigidity of at least about 10 GPa, and
the absorptive optical filter is configured such that the intensity of at least one wavelength of visible electromagnetic radiation that is transmitted through the absorptive optical filter is less than about 10% of the intensity of the at least one wavelength of the visible electromagnetic radiation originally incident upon the absorptive optical filter.

2. The optical component of claim 1, wherein the absorptive optical filter comprises a matrix material and an additive dispersed within the matrix material and configured to absorb the at least 90% of the at least one wavelength of visible electromagnetic radiation.

3. The optical component of claim 2, wherein the matrix material comprises a polymer.

4. The optical component of claim 3, wherein the polymer comprises a thermoset polymer.

5. The optical component of claim 2, wherein the additive comprises a dye.

6. The optical component of claim 1, wherein the grating surface of the diffraction grating comprises a plurality of substantially parallel and/or concentric, periodically spaced grating features.

7. The optical component of claim 1, wherein the absorptive optical filter is configured such that the intensity of at least one wavelength of electromagnetic radiation from about 350 nm to about 800 nm that is transmitted through the absorptive optical filter is less than about 10% of the intensity of the at least one wavelength of the electromagnetic radiation from about 350 nm to about 800 nm originally incident upon the absorptive optical filter.

8. The optical component of claim 1, wherein the second outer surface of the absorptive optical filter is substantially planar.

9. The optical component of claim 1, wherein the first outer surface of the absorptive optical filter conforms to grating features of the grating surface.

10. A system, comprising:
an optical component, comprising:
a diffraction grating comprising a grating surface; and
an absorptive optical filter in contact with the diffraction grating, the absorptive optical filter comprising an absorptive medium having a first outer surface facing the diffraction grating and a second outer surface opposite the first outer surface; and
a receiver;
wherein:
the absorptive optical filter is configured to transmit a first portion of electromagnetic radiation incident upon the absorptive optical filter and to absorb a second portion of the electromagnetic radiation incident upon the absorptive optical filter;
the diffraction grating is configured to receive electromagnetic radiation from and/or transmit electromagnetic radiation to the absorptive optical filter;
the diffraction grating is configured to diffract at least part of the first portion of electromagnetic radiation incident upon the diffraction grating to produce non-zero-order diffracted electromagnetic radiation;
the receiver is configured to receive at least part of the non-zero-order diffracted electromagnetic radiation from the diffraction grating;
the first and/or second outer surfaces of the absorptive medium of the absorptive optical filter are parallel, within 2 degrees, to the grating surface of the diffraction grating; and
the optical component has a modulus of rigidity of at least about 10 GPa.

11. The system of claim 10, wherein at least one of the absorptive optical filter and the diffraction grating comprises a ceramic.

12. The system of claim 11, wherein the ceramic comprises a silicon oxide, an aluminum oxide, a magnesium oxide, a zirconium oxide, a silicon carbide, an aluminum carbide, a magnesium carbide, a zirconium carbide, a silicon nitride, an aluminum nitride, a magnesium nitride, and/or a zirconium nitride.

13. The system of claim 10, wherein at least one of the absorptive optical filter and the diffraction grating comprise a glass.

14. The system of claim 10, wherein at least one of the absorptive optical filter and the diffraction grating comprises a metal.

15. The system of claim 14, wherein the metal comprises aluminum, nickel, copper, titanium, iron, and/or chromium.

16. The system of claim 10, wherein the absorptive medium of the absorptive optical filter comprises a matrix material and an additive dispersed within the matrix material and configured to absorb at least one wavelength of electromagnetic radiation.

17. The system of claim 16, wherein the matrix material comprises a polymer.

18. The system of claim 17, wherein the polymer comprises an epoxy.

19. The system of claim 16, wherein the additive comprises a dye.

20. The system of claim 10, wherein the diffraction grating is a reflective diffraction grating.

21. The system of claim 10, wherein the diffraction grating is a transmissive diffraction grating.

22. The system of claim 10, wherein the grating surface of the diffraction grating comprises a plurality of substantially parallel and/or concentric, periodically spaced grating features.

23. The system of claim 22, wherein the diffraction grating comprises a plurality of substantially linear periodic grating features.

24. The system of claim 10, wherein the second outer surface of the absorptive medium of the absorptive optical filter is substantially planar.

25. The system of claim 10, comprising a directional source of the first portion of electromagnetic radiation.

26. The system of claim 25, comprising a source of the second portion of electromagnetic radiation, the source of the second portion of electromagnetic radiation being different from the directional source.

27. The system of claim 25, wherein the direction of the directional source is configured such that the first portion of electromagnetic radiation is transmitted along a predetermined or adjusted pathway.

28. The system of claim 10, wherein the second portion of electromagnetic radiation includes electromagnetic radiation that would spatially overlap with first order diffracted electromagnetic radiation from the first portion of electromagnetic radiation, were the absorptive optical filter not present.

29. The system of claim 10, wherein the first outer surface of the absorptive medium of the absorptive optical filter is in direct contact with the diffraction grating.

30. The system of claim 29, wherein the first outer surface of the absorptive medium of the absorptive optical filter conforms to grating features of the grating surface.

* * * * *

UNITED STATES PATENT AND TRADEMARK OFFICE
CERTIFICATE OF CORRECTION

| | | |
|---|---|---|
| PATENT NO. | : 9,030,742 B2 | Page 1 of 1 |
| APPLICATION NO. | : 14/274415 | |
| DATED | : May 12, 2015 | |
| INVENTOR(S) | : David E. Ventola et al. | |

It is certified that error appears in the above-identified patent and that said Letters Patent is hereby corrected as shown below:

<u>In the Specification</u>

Column 9, line 30, the word "minor" should be "mirror"

Signed and Sealed this
Eighth Day of September, 2015

Michelle K. Lee
*Director of the United States Patent and Trademark Office*